(12) United States Patent
Ray et al.

(10) Patent No.: US 11,630,216 B2
(45) Date of Patent: Apr. 18, 2023

(54) CHARACTERIZATION OF A CLOUD ATMOSPHERE USING LIGHT BACKSCATTERED AT TWO ANGLES

(71) Applicant: Rosemount Aerospace Inc., Burnsville, MN (US)

(72) Inventors: Mark Ray, Burnsville, MN (US); Jennifer M. Alexander, Minneapolis, MN (US); Kaare Josef Anderson, Farmington, MN (US); Darren G. Jackson, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 570 days.

(21) Appl. No.: 16/549,975

(22) Filed: Aug. 23, 2019

(65) Prior Publication Data

US 2021/0055422 A1 Feb. 25, 2021

(51) Int. Cl.
*G01N 15/02* (2006.01)
*G01S 17/95* (2006.01)
*B64D 45/00* (2006.01)
*G08G 5/00* (2006.01)

(52) U.S. Cl.
CPC .............. *G01S 17/95* (2013.01); *B64D 45/00* (2013.01); *G01N 15/0211* (2013.01); *G08G 5/0091* (2013.01)

(58) Field of Classification Search
None
See application file for complete search history.

(56) References Cited

U.S. PATENT DOCUMENTS

| 5,239,352 | A | * | 8/1993 | Bissonnette | ......... G01S 7/4816 356/28 |
|---|---|---|---|---|---|
| 7,126,687 | B2 | | 10/2006 | Hill et al. | |
| 8,144,325 | B2 | | 3/2012 | Ray et al. | |
| 8,338,785 | B2 | * | 12/2012 | Ray | ........................ B64D 15/20 250/338.1 |
| 8,502,975 | B2 | | 8/2013 | Roy et al. | |
| 8,831,884 | B2 | | 9/2014 | Ray et al. | |
| 9,476,980 | B2 | | 10/2016 | Thayer et al. | |

(Continued)

FOREIGN PATENT DOCUMENTS

EP 2277776 A2 1/2011

OTHER PUBLICATIONS

Extended European Search Report dated Aug. 11, 2020, received for corresponding European Application No. 19216111.5, 6 pages.

*Primary Examiner* — Brent Swarthout
(74) *Attorney, Agent, or Firm* — Kinney & Lange, P.A.

(57) ABSTRACT

Apparatus and associated methods relate to determining an effective size, quantity, shape, and type of water particles in a cloud atmosphere based on differences in amplitudes of optical signals backscattered at different backscattering angles. Off-axis backscattering—backscattering at angles other than 180 degrees—is affected by the effective size, quantity, shape, and type of water droplets. Detected amplitudes of optical signals that are backscattered at different angles are used to indicate the effective size, quantity, shape, and type of water particles in the cloud atmosphere. In some embodiments, optical emitters and detectors are configured to measure amplitudes of optical signals backscattered at backscattering angles of both on-axis—180 degrees—and off-axis varieties.

19 Claims, 8 Drawing Sheets

(56) References Cited

U.S. PATENT DOCUMENTS

| | | |
|---|---|---|
| 10,031,059 B1 * | 7/2018 | Ray .................... G01S 7/4818 |
| 2018/0275038 A1 | 9/2018 | Cantin |
| 2019/0107496 A1 | 4/2019 | Fan et al. |

* cited by examiner

CHARACTERIZATION OF A CLOUD ATMOSPHERE USING LIGHT BACKSCATTERED AT TWO ANGLES

BACKGROUND

Various cloud conditions can present risks to aircraft when traveling through them. If the temperature of a cloud atmosphere is below the freezing point for water, water droplets can become super-cooled liquid droplets. These super-cooled liquid droplets can then undergo a liquid-to-solid phase change upon impact with an aircraft surface. Ice accretes at different surface regions for different sizes of the super-cooled liquid droplets in the cloud atmosphere. Thus, characterizing the sizes of super-cooled water droplets in a cloud atmosphere can facilitate determination of surface regions where ice will accrete as well as providing alerts of potentially dangerous conditions to a pilot. Accurately determining the liquid water content (LWC) can help determine the severity of an icing encounter.

Super-cooled small water droplets tend to form ice only on leading edges of an aircraft's exterior surface. Super-cooled Large water Droplets (SLDs), however, can strike the leading edge of a wing and run back past the icing protection systems, or can traverse airflow vectors and strike surfaces aft of these leading edges. Ice that forms on unprotected surface regions can severely alter the aerodynamics of the aircraft. Such ice accretion may cause aircraft stall or result in unpredictable aircraft control variation that might lead to flight issues. When in a cloud, ice can form on control surfaces and/or lift surfaces.

Not every cloud, however, has a significant SLD population. Different clouds and different atmospheric conditions may be accompanied by various water droplet size distributions, water content, different ice/liquid ratios, etc., some of which may be entirely safe to an aircraft, while others may not be safe. Such water droplet size distributions, water content, and ice/liquid ratios may be measured as cloud metrics using various types of instruments.

SUMMARY

Apparatus and associated methods relate to a system for characterizing a cloud atmosphere. The system includes an optical emitter configured to emit an optical beam into the cloud atmosphere. The system includes a first optical detector configured to detect a first portion of the optical beam backscattered by the cloud atmosphere at a first backscatter angle. The system includes a second optical detector configured to detect a second portion of the optical beam backscattered by the cloud atmosphere at a second backscatter angle different from the first backscatter angle. The system also includes a cloud-characteristic calculator configured to calculate one or more cloud parameters of the cloud atmosphere based the detected first and second portions.

Some embodiments relate to a method for characterizing a cloud atmosphere. The method including emitting, via an optical emitter, an optical beam into the cloud atmosphere. The method including detecting, via a first optical detector, a first portion of the optical beam backscattered by the cloud atmosphere at a first backscatter angle. The method including detecting, via a second optical detector, a second portion of the optical beam backscattered by the cloud atmosphere at a second backscatter angle different from the first backscatter angle. The method also including calculating, via a cloud-characteristic calculator, one or more cloud parameters of the cloud atmosphere based on the detected first and second portions.

DETAILED DESCRIPTION

Apparatus and associated methods relate to determining an effective size, quantity, shape, and type of water particles in a cloud atmosphere based on differences in amplitudes of optical signals backscattered at different backscattering angles. Off-axis backscattering—backscattering at angles other than 180 degrees—is affected by the effective size, quantity, shape, and type of water particles. A ratio of detected amplitudes of optical signals that are backscattered at different angles is used to indicate the effective size, quantity, shape, and type of water particles in the cloud atmosphere. In some embodiments, optical emitters and detectors are configured to measure amplitudes of optical signals backscattered at backscattering angles of both on-axis—180 degrees—and off-axis varieties.

Figure 1:
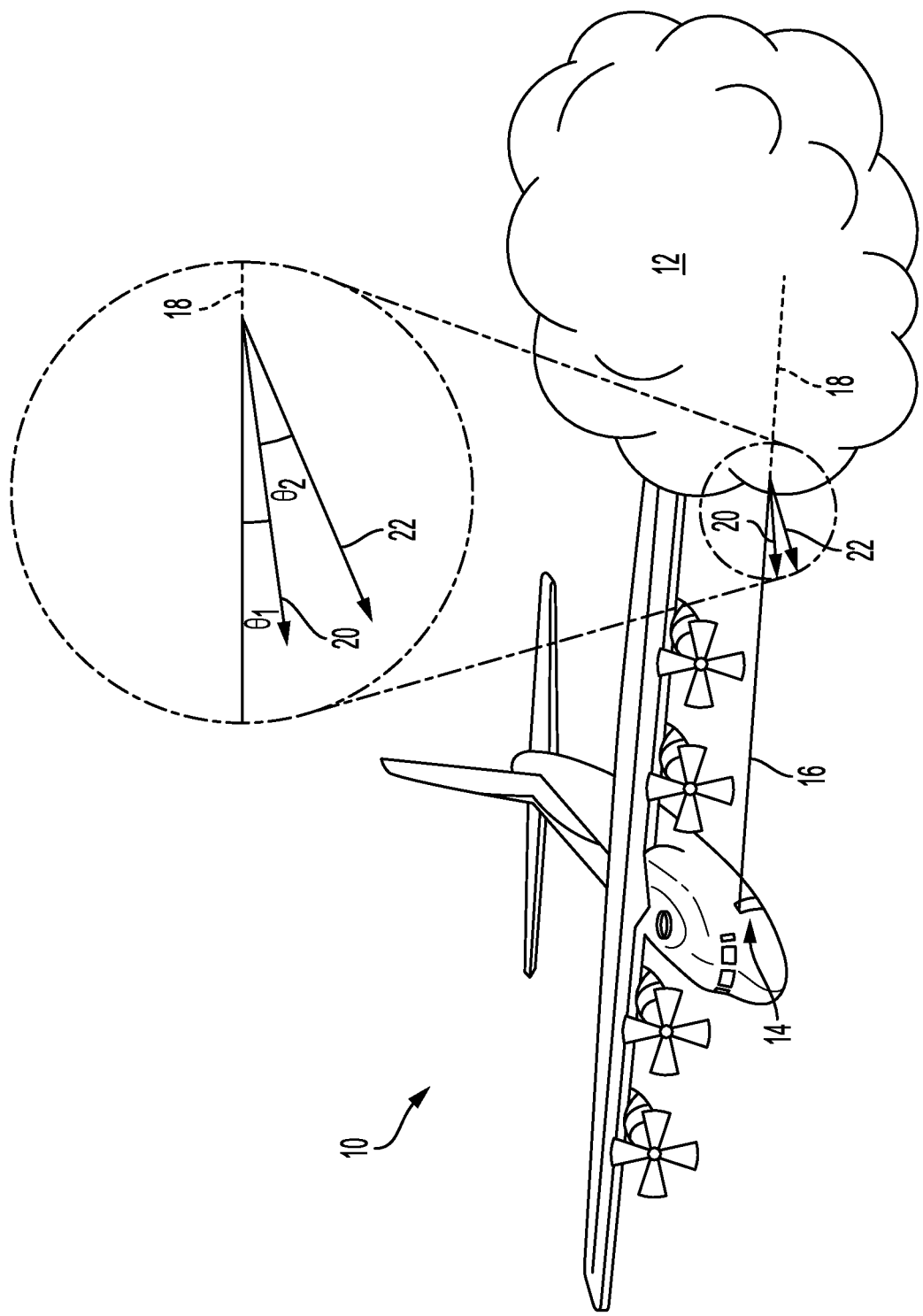
FIG. 1 is a schematic view of an aircraft equipped to characterize a cloud atmosphere.

FIG. 1 is a schematic view of an aircraft equipped to measure an effective size of liquid droplets in a cloud atmosphere. In FIG. 1, aircraft 10 is traveling through cloud atmosphere 12. Aircraft 10 is equipped with cloud conditions measurement system 14 that is shown probing cloud atmosphere 12 by projecting optical beam 16 along emission axis 18 into cloud atmosphere 12. Optical beam 16 projects from an optical emitter aligned with emission axis 18. Pulsed beam 16 is then backscattered by liquid water droplets and/or ice crystals of cloud atmosphere 12. In the depicted embodiment, cloud conditions measurement system 14 is shown receiving first and second portions 20 and 22 backscattered with backscattering angles $\theta_1$ and $\theta_2$ respectively. Cloud conditions measurement system 14 has optical detectors configured to detect portions 20 and 22 backscattered with backscattering angles $\theta_1$ and $\theta_2$ respectively, by cloud atmosphere 12. Cloud conditions measurement system 14 can calculate cloud parameters based on detector signals indicative of backscattered portions 20 and 22 received by cloud conditions measurement system 14.

Optical beam 16 can be projected into cloud atmosphere 12 within a field of view centered on a principal emission direction, which is collinear with emission axis 18. The emission field of view can be within an emission angle threshold of the principal emission direction. For example, the emission field of view can be +/−0.25°, 0.5°, 1°, 2°, or 3°, for example. Portions 20 and 22 backscattered by liquid water droplets and/or ice crystals within a projection volume of cloud atmosphere 12 are those portions falling within detection fields of view of the optical detectors of cloud conditions measurement system 14. The detection fields of view can be centered on principal detection directions, which are directed so that the detection fields of view intersect the emission field of view. The detection fields of view can be within detection angle thresholds of the principal detection directions. Angles between the principle emission direction and the principle detection directions can determine the backscattering angles $\theta_1$ and $\theta_2$ that are measureable. Any light detected by the optical detectors is backscattered by liquid water particles and/or ice crystals from within intersecting volumes of the emission field of view and the detection fields of view. The optical detectors can then generate electrical signals corresponding to the detected light backscattered by cloud atmosphere 12. These generated electrical signals are indicative of various metrics of cloud atmosphere 12.

The effective size, quantity, shape, and type of water droplets and/or ice crystals determines how an optical beam can be backscattered thereby. For example, relatively large-sized water droplets preferentially backscatter an optical beam directly—with a backscatter angle of 180°. Smaller sizes of water droplets permit a greater percentage of light to be backscattered at in an off-axis fashion—less than 180°. Thus, the relationship between the electrical signals generated by optical detectors that are configured to detect backscatter with different backscattering angles is indicative of the effective size of the water particles that backscattered the optical beam.

Figure 2:
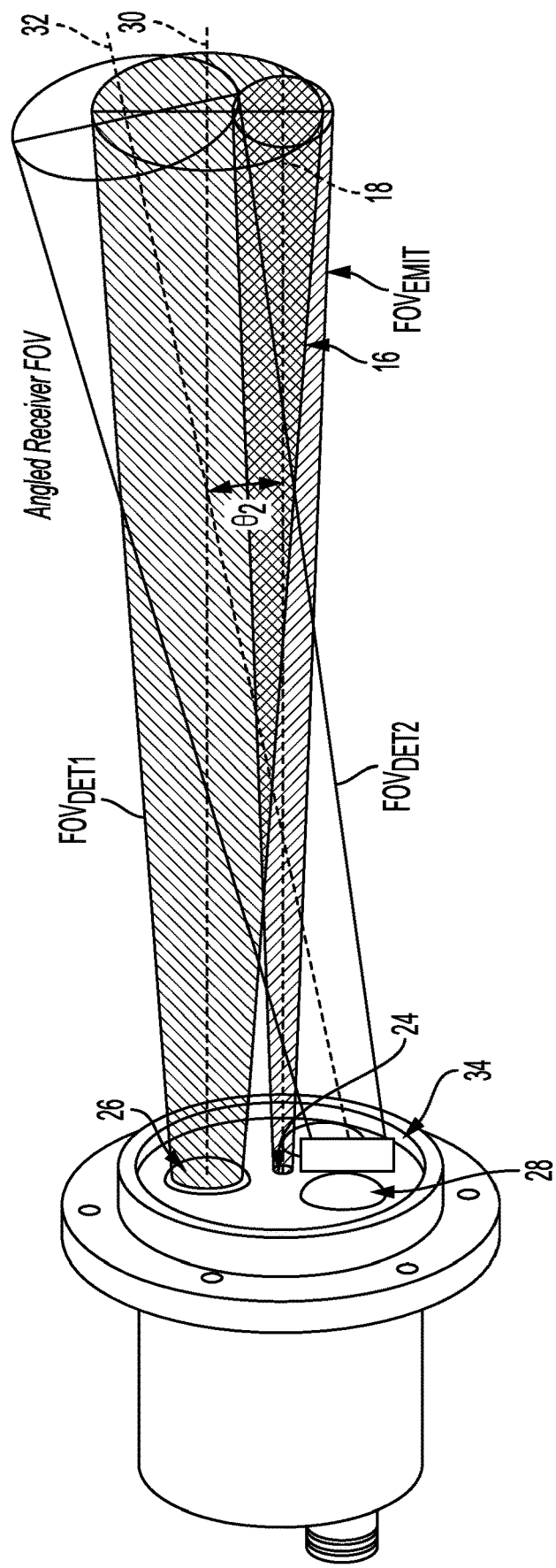
FIG. 2 is a schematic diagram of a system for characterizing a cloud atmosphere using optical signals backscattered at two different backscattered angles.

FIG. 2 is a schematic diagram of a system for determining an effective size of water particles in a cloud atmosphere using optical signals backscattered at two different backscattered angles. In FIG. 2, cloud conditions measurement system 14 has optical emitter 24, first optical detector 26 and second optical detector 28. Optical emitter 24 is shown projecting optical beam within emission field of view $FOV_{EMIT}$ centered on a principal emission direction, which is collinear with emission axis 18.

First detection field of view $FOV_{DET1}$ is depicted as being centered on a first detection direction, which is collinear with first detection axis 30. First detection axis 30 and emission axis 18 are shown as being substantially parallel to one another. Such a configuration permits detection of portions of an emitted optical beam that are directly backscattered (i.e., with a backscattering angle of 180°).

Second Detection field of view $FOV_{DET2}$ is depicted as being centered on a second detection direction, which is collinear with second detection axis 32. Second detection axis 32 and emission axis 18 are shown as being at angle $\theta_2$ with respect to one another. Such a configuration permits detection of portions of an emitted optical beam that are backscattered in an off-axis fashion (i.e., with a backscattering angle less than 180°). In the depicted embodiment, the off-axis orientation of second optical detector 28 is determined by detector aligner 34, such as an optical wedge or prism, aligned with second optical detector 28.

Figure 3:
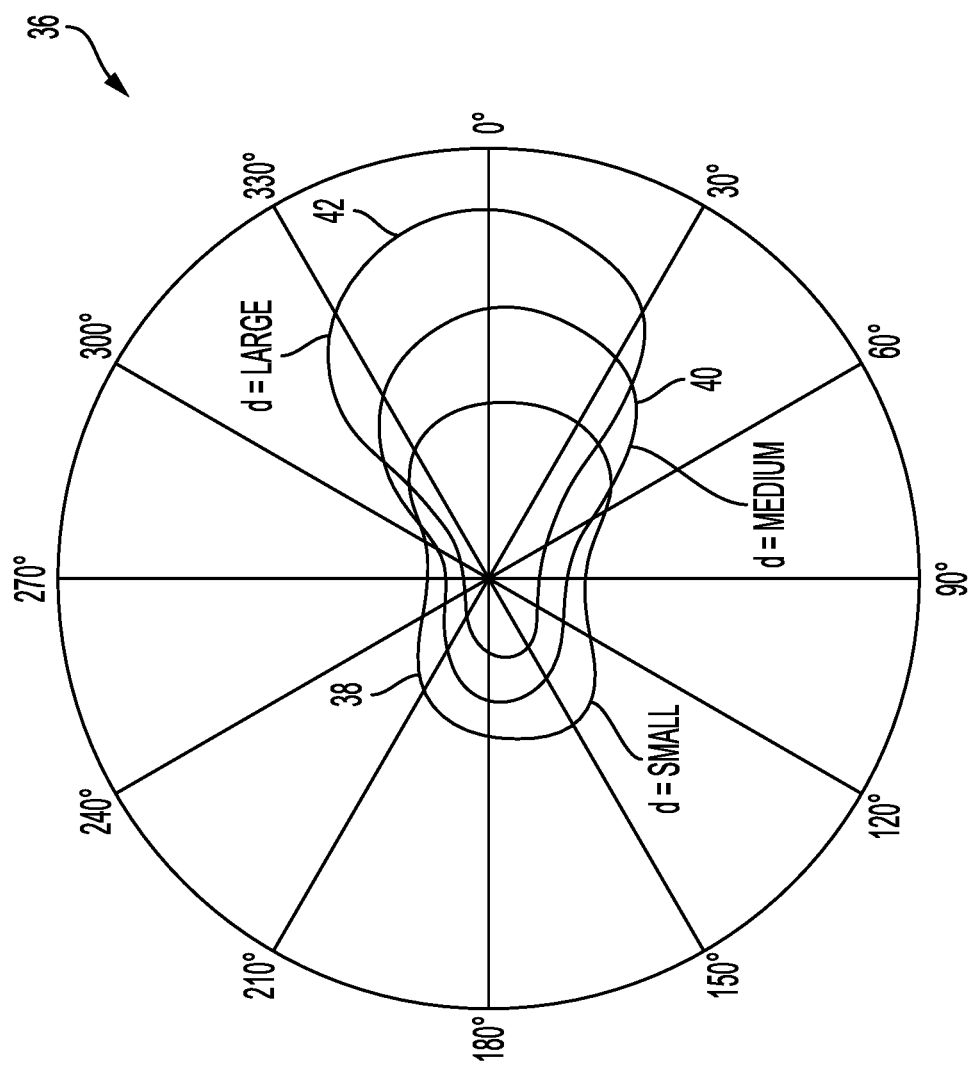
FIG. 3 is a polar diagram of scattering amplitude as a function of scattering angle for different effective size water particles.

FIG. 3 is a normalized polar diagram of scattering amplitude as a function of scattering angle for different effective size water particles. Polar diagram 36 include scattering amplitude/angle relations 38, 40 and 42 corresponding to effective sizes (e.g., diameters) of water particles 0.5, 5 and 50 μm. For particles that are larger than one-tenth of the wavelength λ of light, Mie scattering becomes an operative scattering mechanism. Mie scattering produces a pattern like an antenna lobe, with a more intense forward lobe and less intense backscattering lobe for larger particles. Scattering amplitude/angle relation 40 is indicative of particles in the Mie scattering regime. Scattering amplitude/angle relation 42 has a forward lobe that is significantly larger than its backscattering lobe.

For a given particle size and wavelength of light, Mie scattering determines multi-lobed fine structure in the polar diagram of scattering amplitude for spherical particles as a function of scattering angle. The FIG. 3 polar diagram does not depict such multi-lobed fine structure, because of the polydispese size distributions of cloud atmospheres. Such various multi-lobed fine structures, when combined in a composite polar diagram of scattering amplitude as a function of scattering angle, can result in a smoothing of these various fine structures, as depicted in FIG. 3. For non-spherical particles, such as, for example, ice crystals, the angular scattering profile, albeit different from the depicted Mie scattering profiles, can be used to obtain effective size information as well.

Figure 4:
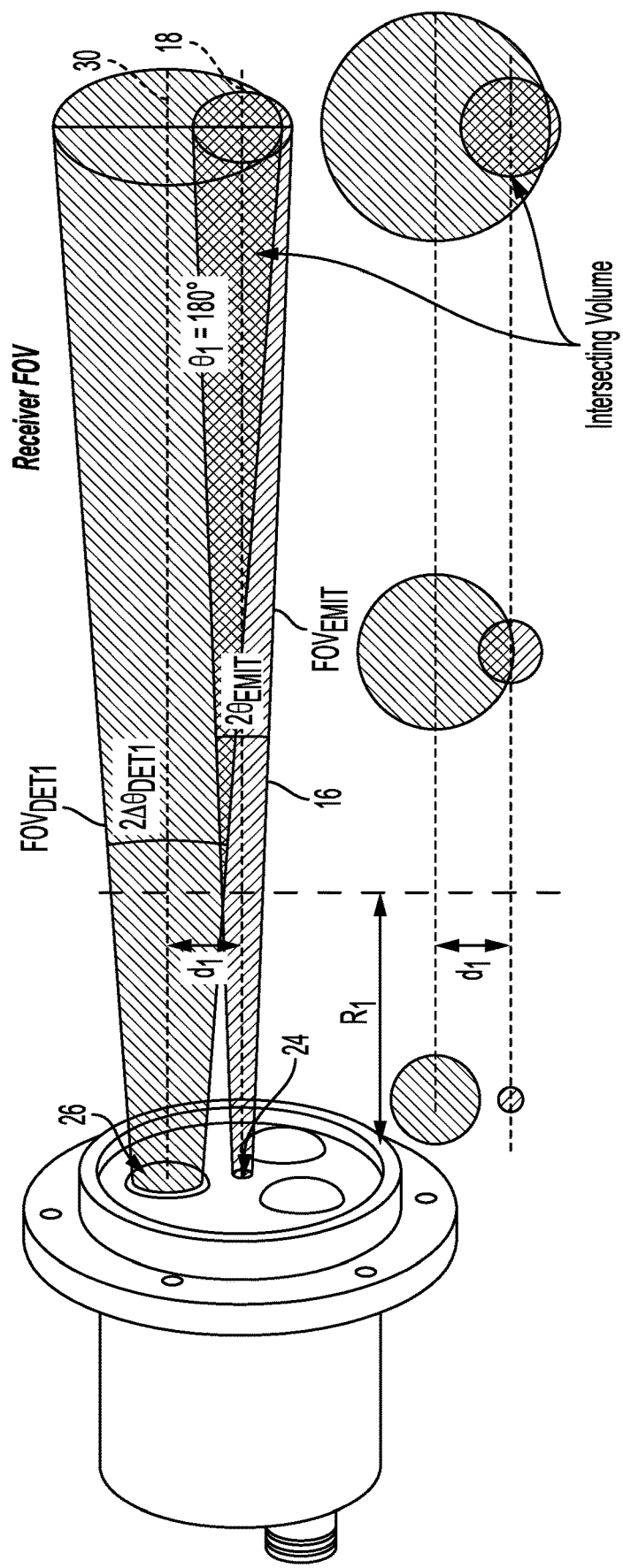
FIG. 4 is a schematic diagram of the system depicted in FIG. 2 showing intersecting emitter and detector fields of view.

FIG. 4 is a schematic diagram of the system depicted in FIG. 2 showing intersecting emitter and detector fields of view. In FIG. 4, emitter field of view $FOV_{EMIT}$ and first detector field of view $FOV_{DET1}$ are shown intersecting one another. First optical detector 26 is located a first distance $d_1$ in a first direction transverse from the principal emission direction from optical emitter 24. First optical detector 26 and has first detection field of view $FOV_{DET1}$ intercepting emission field of view $FOV_{EMIT}$. First detection field of view $FOV_{DET1}$ is centered upon a first principle detection direction, which is collinear with first detection axis 30. The principle emission direction and the first principle detection direction determine the first backscatter angle.

The intersection of emitter field of view $FOV_{EMIT}$ and first detection field of view $FOV_{DET1}$ begins at a distance or range $R_1$ from optical emitter 24 and first optical detector 26. Range $R_1$ of the intersecting volumes of emitter field of view $FOV_{EMIT}$ and first detection field of view $FOV_{DET1}$ is determined based on: i) the distance d1 separating optical emitter 24 and first optical detector 26; ii) angle $\theta_1$ between the principle emission direction and the first principle detection direction; and iii) diverging angles $2\Delta\theta_{EMIT}$ and $2\Delta\theta_{DET1}$ of emitter field of view $FOV_{EMIT}$ and first detection field of view $FOV_{DET1}$, respectively. The distance or range $R_2$ from optical emitter 24 and second optical detector 28 is determined based on the corresponding parameters of second optical detector 28. In some embodiments, the intersecting volumes will have approximately the same range, and other embodiments, the intersecting volumes will have dissimilar ranges. For example, in one embodiment the distance $d_2$ between optical emitter 24 and second optical detector 28 will be greater than the distance $d_1$ between optical emitter 24 and first optical detector 26 so as to nominally equalize the ranges $R_1$ and $R_2$ to the intersecting volumes.

The intersecting volumes associated with optical detectors 26 and 28 will necessarily be different due to the differences in the orientation of first and second detection axes 30 and 32. Backscattering will begin at the ranges of the intersecting volumes, and continue throughout the intersecting volumes. As backscattering occurs, however, attenuation of the optical beam emitted into the cloud atmosphere also occurs. Thus, the differences between the intersecting volumes at great distances can be less consequential than differences in the ranges, at which point attenuation of the optical signal can be modest.

The portion of the light backscattered within the intersecting volume that is detectable by first optical detector 26 will have a distribution of backscattering angles nominally centered on angle $\theta_1$, which is the angle between the principle emission direction and the first principle detection direction. There will be a distribution about the nominal backscattering angle $\theta_1$ due to diverging angles $2\Delta\theta_{EMIT}$ and $2\Delta\theta_{DET1}$ of emitter field of view $FOV_{EMIT}$ and first detection field of view $FOV_{DET1}$.

Figure 5:
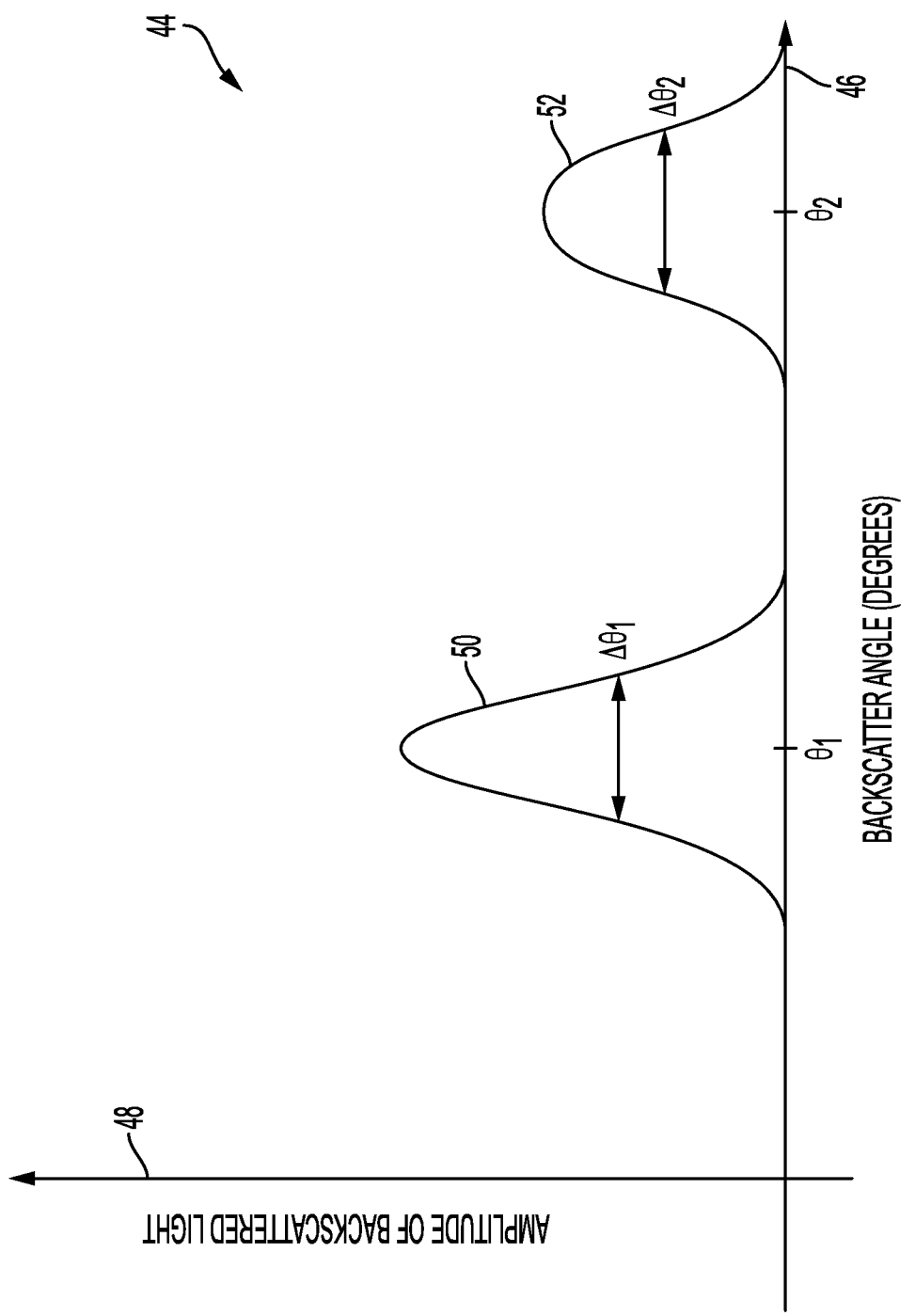
FIG. 5 is a graph depicting the backscattering angles that are detectable using the system depicted in FIG. 2.

FIG. 5 is a graph depicting the backscattering angles that are detectable using the system depicted in FIG. 2. In FIG. 5, graph 44 includes horizontal axis 46 and vertical axis 48. Horizontal axis 46 is indicative of backscattering angle (degrees). Vertical axis 48 is indicative of amplitude of light backscattered by a cloud atmosphere as detected by first and second optical detectors 26 and 28. Amplitude/angle relation 50 indicates the amplitude/angle relation corresponding to the signal sensed by first optical detector 26. First optical detector 26 will generate a signal indicative of the integrated area under amplitude/angle relation 50. Amplitude/angle relation 52 indicates the amplitude/angle relation corresponding to the signal sensed by second optical detector 28. Second optical detector 28 will generate a signal indicative of the integrated area under amplitude/angle relation 52. Amplitude/angle relations 50 and 52 provide visualization of the distribution of backscattering angles that are detectable by first and second optical detectors 26 and 28, respectively.

Figure 6:
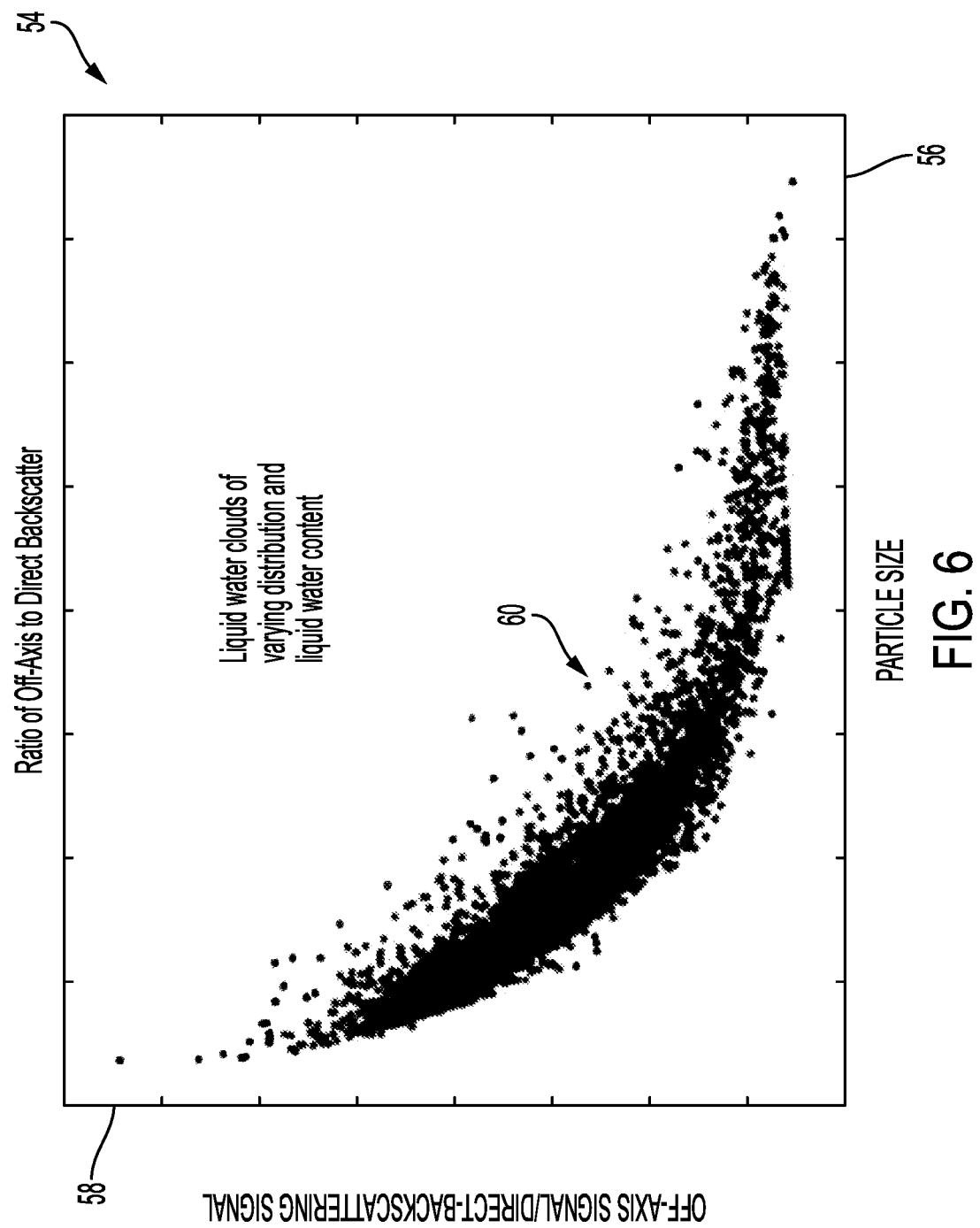
FIG. 6 is a graph depicting a relationship between the off-axis/direct scatter ratio to effective size of water particles in a cloud atmosphere.

FIG. 6 is a graph depicting a relationship between the off-axis/direct backscatter ratio to effective size of water particles in a cloud atmosphere. In FIG. 6, graph 54 includes horizontal axis 56 and vertical axis 58. Horizontal axis 56 is indicative of effective size in μm (e.g., effective diameter) of water particles in a cloud atmosphere. Vertical axis 58 is indicative of the ratio of signal amplitudes of second and first optical detectors 28 and 26. The ratio of second and first optical detectors 28 and 26 is indicative of the ratio of off-axis backscattering (detectable by second optical detector 28) to direct backscattering (detectable by first optical detector 26). In some embodiments, a difference of detected amplitudes of optical signals that are backscattered at different angles is used to indicate the effective size, quantity, shape, and type of water particles in the cloud atmosphere. In addition, other embodiments may include optical devices within the path of the optical receiver to split the optical signal into its various polarization states to provide further discrimination of cloud particles.

Graph 54 also depicts simulation results 60 (i.e., ratio of off-axis to direct backscattering) of various cloud atmospheres. The various cloud atmospheres characterized by an effective droplet size can have different types of drop size distributions, which are responsible for the breadth of simulation results 60. A clear trend in simulation results 60 can be seen despite the breadth of simulation results 60. A curve can be fit to this data, for example, and the fit curve can be used to determine an effective size of water particles in a cloud atmosphere based on the ratio of signals detected by second and first optical detectors 28 and 26.

Figure 7:
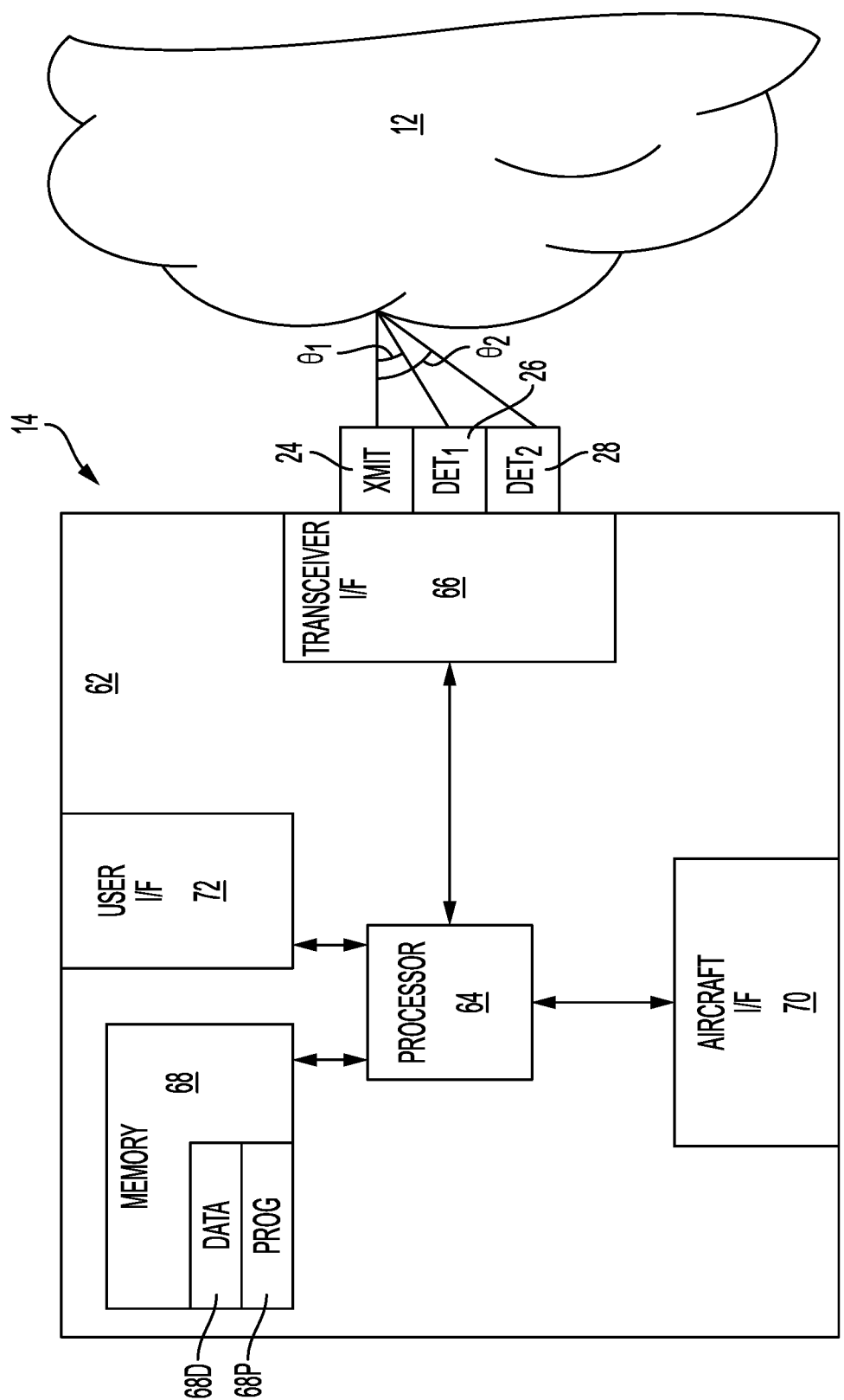
FIG. 7 is a block diagram of an embodiment of a system for determining an effective size of water particles in a cloud atmosphere using optical signals backscattered at two different backscattered angles.

FIG. 7 is a block diagram of an embodiment of a system for determining an effective size of water particles in a cloud atmosphere using optical signals backscattered at two different backscattered angles. In FIG. 7, cloud conditions measurement system 14 includes controller 62, optical emitter 24, and first and second optical detectors 26 and 28. Optical emitter 24 is configured to emit an optical beam into cloud atmosphere 12. Each of first and second optical detectors 26 and 28 is configured to detect a portion of the emitted optical beam backscattered by cloud atmosphere 12. First optical detector 26 is configured to detect light backscattered by cloud atmosphere 12 with nominal backscattering angle $\theta_1$. Second optical detector 28 is configured to detect light backscattered by cloud atmosphere 12 with nominal backscattering angle $\theta_2$.

Controller 62 includes processor(s) 64, optical transceiver interface 66, storage device(s) 68, aircraft interface 70, and user interface 72. Processor(s) 64 can receive program instructions 68P from storage device(s) 68. Processor(s) 64 can be configured to control cloud conditions measurement system 14, based on received program instructions 68P. For example processor(s) 64 can be configured to send optical transceiver interface 66 a signal that causes optical emitter 24 to emit an optical beam. The emitted optical beam is directed into cloud atmosphere 12. First and second optical detectors 26 and 28 are configured to generate signals indicative of portions of the emitted optical beam backscattered by cloud atmosphere 12.

Optical transceiver interface 66 provides an electrical interface between controller 62 and the optical transceivers: optical emitter 24 and optical detectors 26 and 28. Processor(s) 64 receives, from optical transceiver interface 66, signals indicative of the detected portions of the emitted optical beam backscattered by cloud atmosphere 12. Processor(s) 64 can then determine particle characteristics of cloud atmosphere 12 based on the signals received from optical transceiver interface 66.

Processor(s) 64 can compare the determined particle characteristics with predetermined thresholds to determine if the cloud atmosphere has water particles that could cause severe icing, for example. If, for example, one or more of the determined particle characteristics exceeds a predetermined threshold, processor(s) 64 can generate an alert signal and send the generated alert signal to aircraft interface 70. In some embodiments, processor(s) 64 can store and/or log the associated parameter values in data memory 68D. In some embodiments, processor(s) 64 may interface with other input and output devices via user interface 72.

As illustrated in FIG. 7, controller 62 includes processor(s) 64, optical transceiver interface 66, storage device(s) 68, aircraft interface 70, and user interface 72. However, in certain examples, controller 62 can include more or fewer components. For instance, in examples where controller 62 is an avionics unit, controller 62 may not include user interface 72. In some examples, such as where controller 62 is a mobile or portable device such as a laptop computer, controller 62 may include additional components such as a battery that provides power to components of controller 62 during operation.

Processor(s) 64, in one example, is configured to implement functionality and/or process instructions for execution within controller 62. For instance, processor(s) 64 can be capable of processing instructions stored in storage device(s) 68. Examples of processor(s) 64 can include any one or more of a microprocessor, a controller, a digital signal processor(s) (DSP), an application specific integrated circuit (ASIC), a field-programmable gate array (FPGA), or other equivalent discrete or integrated logic circuitry. Processor(s) 64 can be configured to operate as a cloud-conditions calculator that calculates one or more cloud parameters of a cloud atmosphere, such as, for example, effective size of water droplets, liquid water content, effective size of ice crystals, ice water content, and ice crystal shape. Such cloud parameters can be determined based on two portions of light backscattered by the cloud atmosphere at different backscattering angles.

Storage device(s) 68 can be configured to store information within controller 62 during operation. Storage device(s) 68, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 68 is a temporary memory, meaning that a primary purpose of storage device(s) 68 is not long-term storage. Storage device(s) 68, in some examples, is described as volatile memory, meaning that storage device(s) 68 do not maintain stored contents when power to controller 62 is turned off. Examples of volatile memories can include random access memories (RAM), dynamic random access memories (DRAM), static random access memories (SRAM), and other forms of volatile memories. In some examples, storage device(s) 68 is used to store program instructions for execution by processor(s) 64. Storage device(s) 68, in one example, is used by software or applications running on controller 62 (e.g., a software program implementing long-range cloud conditions detection) to temporarily store information during program execution.

Storage device(s) 68, in some examples, can also include one or more computer-readable storage media. Storage device(s) 68 can be configured to store larger amounts of information than volatile memory. Storage device(s) 68 can further be configured for long-term storage of information. In some examples, storage device(s) 68 include non-volatile storage elements. Examples of such non-volatile storage elements can include magnetic hard discs, optical discs, flash memories, or forms of electrically programmable memories (EPROM) or electrically erasable and programmable (EEPROM) memories.

Optical transceiver interface 66, in some examples, includes a communications module. Optical transceiver interface 66, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB).

Aircraft interface 70 can be used to communicate information between controller 62 and an aircraft. In some embodiments, such information can include aircraft conditions, flying conditions, and/or atmospheric conditions. In some embodiments, such information can include data processed by controller 62, such as, for example, alert signals. Aircraft interface 70 can also include a communications module. Aircraft interface 70, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

User interface 72, in some examples, is configured to receive input from a user. Examples of user input interface 72 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

User interface 72 can be configured to provide output to a user. Examples of user interface 72 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Figure 8:
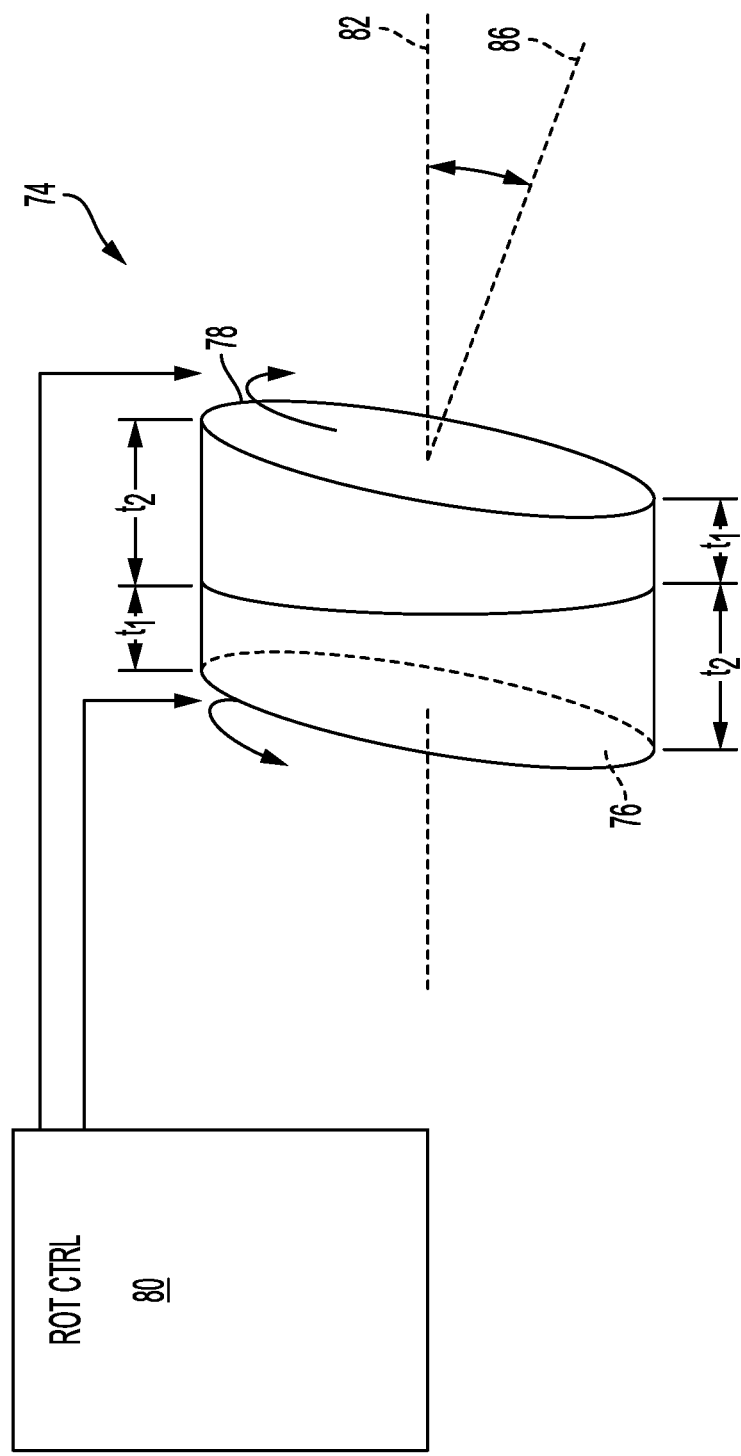
FIG. 8 is a diagram of an embodiment of a detector aligner for optical detection of a backscattered light.

FIG. 8 is an embodiment of a detector aligner for optical detection of a backscattered light. In FIG. 8, detector aligner 74 includes first optical wedge or prism 76, second optical wedge or prism 78 and wedge rotation controller 80. Each of first and second optical wedges 76 and 78 has a thick dimension $t_2$ and a thin dimension $t_1$. Each of first and second optical wedges 76 and 78 are rotatable about optical axis 82. In FIG. 8, first optical wedge 76 is depicted as being rotated such that it thick side is aligned with the thin side of second optical wedge 78. In such a configuration, an optical beam projected along optical axis 82 will remain directed along optical axis 82 (albeit translated laterally a modest amount).

Controller 80 is configured to rotate both first and second optical wedges 76 and 78 in a coordinated fashion. First and second optical wedges 76 and 78 are rotated in opposite directions (e.g., one in a right-hand or clockwise direction and the other in a left-hand or counter-clockwise direction). Coordinated rotations, such as this, will cause an optical beam projected along optical axis 82 to be steered in the direction of the thickest part of the combined first and second optical wedges 76 and 78. For example, if first optical wedge 76 is rotated 90° clockwise, and second optical wedge 78 is rotated 90° counter-clockwise, the optical beam will be steered in the direction indicated by axis 86. Directional controller 74 can be used to control direction of sensitivity of one or more optical detectors, such as optical detectors 26 and 28, for example.

Various other methods of controlling directional sensitivity of optical detectors can be used in various other embodiments. For example, in some embodiments, directional control of optical emitter 24 can be used to control/vary the directional sensitivity of optical detectors 26 and 28. In other embodiments, optical detectors 26 and 28 can be directionally controlled via directional control motors, for example.

Discussion of Possible Embodiments

The following are non-exclusive descriptions of possible embodiments of the present invention.

Apparatus and associated methods relate to a system for characterizing a cloud atmosphere. The system includes an optical emitter configured to emit an optical beam into the cloud atmosphere. The system includes a first optical detector configured to detect a first portion of the optical beam backscattered by the cloud atmosphere at the first backscatter angle. The system includes a second optical detector configured to detect a second portion of the optical beam backscattered by the cloud atmosphere at the second backscatter angle different from the first backscatter angle. The system also includes a cloud-characteristic calculator configured to calculate one or more cloud parameters of the cloud atmosphere based the detected first and second portions.

The system of the preceding paragraph can optionally include, additionally and/or alternatively, any one or more of the following features, configurations and/or additional components:

A further embodiment of the foregoing system, wherein cloud-characteristic calculator is configured to calculate one or more cloud parameters of the cloud atmosphere based on a ratio of the detected first and second portions.

A further embodiment of any of the foregoing systems, wherein cloud-characteristic calculator is configured to calculate one or more cloud parameters of the cloud atmosphere based on a difference between the detected first and second portions.

A further embodiment of any of the foregoing systems, wherein a magnitude of a difference between the first and second backscatter angles can be at least 3 degrees.

A further embodiment of any of the foregoing systems, wherein the first backscatter angle can be 180 degrees+/−3 degrees.

A further embodiment of any of the foregoing systems, wherein the one or more cloud parameters can include at least one of effective size of water droplets, liquid water content, effective size of ice crystals, ice water content, and ice crystal shape.

A further embodiment of any of the foregoing systems, wherein the optical emitter can be configured to emit electromagnetic radiation at wavelengths in the infra-red spectrum.

A further embodiment of any of the foregoing systems, wherein the optical emitter is configured to emit electromagnetic radiation at wavelengths in the visible spectrum.

A further embodiment of any of the foregoing systems, wherein the light emitted into the cloud atmosphere can be polarized.

A further embodiment of any of the foregoing systems, wherein the first optical detector can be located a first distance in a first direction transverse from a principal emission direction from the optical emitter and can have a first detection field of view intercepting the emission field of view. The first detection field of view can be centered upon a first principle detection direction. The principle emission direction and the first principle detection direction can define the first backscatter angle.

A further embodiment of any of the foregoing systems, wherein the second optical detector can be located a second distance in a second direction transverse from a principal emission direction from the optical emitter and can have a second detection field of view intercepting the emission field of view. The second detection field of view can be centered upon a second principle detection direction. The principle emission direction and the second principle detection direction can define the second backscatter angle.

A further embodiment of any of the foregoing systems can further include a detector aligner configured to align a detection direction of the second optical detectors so as to change the second backscatter angle of the detected second portion of the optical beam backscattered by the cloud atmosphere.

A further embodiment of any of the foregoing systems, wherein the detector aligner can include a prism located between the one of the first and or second optical detector and the cloud atmosphere.

A further embodiment of any of the foregoing systems, wherein the detector aligner can include two prisms located between the second optical detector and the cloud atmosphere, the two prisms configured to coordinately rotate so as to increase and/or decrease the second backscatter angle of the detected second portion of the optical beam backscattered by the cloud atmosphere.

Some embodiments relate to a method for characterizing a cloud atmosphere. The method including emitting, via an optical emitter, an optical beam into the cloud atmosphere. The method including detecting, via a first optical detector, a first portion of the optical beam backscattered by the cloud atmosphere at the first backscatter angle. The method including detecting, via a second optical detector, a second portion of the optical beam backscattered by the cloud atmosphere at the second backscatter angle different from the first backscatter angle. The method also including calculating, via a cloud-characteristic calculator, one or more cloud parameters of the cloud atmosphere based on the detected first and second portions.

The method of the preceding paragraph can optionally include, additionally and/or alternatively, any one or more of the following features, configurations and/or additional components:

A further embodiment of the foregoing method, wherein calculating, via a cloud-characteristic calculator, one or more cloud parameters of the cloud atmosphere can be based on a ratio of the detected first and second portions.

A further embodiment of any of the foregoing methods, wherein calculating, via a cloud-characteristic calculator, one or more cloud parameters of the cloud atmosphere can be based on a difference between the detected first and second portions.

A further embodiment of any of the foregoing methods can further include controlling, via a detector aligner, a direction of the second optical detector, so as to control the second backscatter angle.

A further embodiment of any of the foregoing methods, wherein the one or more cloud parameters includes at least one of effective size of water droplets, liquid water content, effective size of ice crystals, ice water content, and ice crystal shape.

A further embodiment of any of the foregoing methods, wherein the optical emitter is configured to emit electromagnetic radiation at wavelengths in the infra-red spectrum.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for characterizing a cloud atmosphere, the system comprising:
an optical emitter configured to emit an optical beam into the cloud atmosphere;
a first optical detector configured to detect a first portion of the optical beam backscattered by the cloud atmosphere at a first backscatter angle, wherein the first backscatter angle is defined as a first difference between a first principle emission direction and a principle detection direction;
a second optical detector configured to detect a second portion of the optical beam backscattered by the cloud atmosphere at a second backscatter angle different from the first backscatter angle, wherein the second backscatter angle is defined as a second difference between the principle emission direction and a second principle detection direction, wherein a magnitude of a difference between the first and second backscatter angles is at least 3 degrees; and
a cloud-characteristic calculator configured to calculate one or more cloud parameters of the cloud atmosphere based on the detected first and second portions.

2. The system of claim 1, wherein cloud-characteristic calculator is configured to calculate one or more cloud parameters of the cloud atmosphere based on a ratio of the detected first and second portions.

3. The system of claim 1, wherein cloud-characteristic calculator is configured to calculate one or more cloud parameters of the cloud atmosphere based on a difference between the detected first and second portions.

4. The system of claim 1, wherein the first backscatter angle is 180 degrees+/−3 degrees.

5. The system of claim 1, wherein the one or more cloud parameters includes at least one of effective size of water droplets, liquid water content, effective size of ice crystals, ice water content, and ice crystal shape.

6. The system of claim 1, wherein the optical emitter is configured to emit electromagnetic radiation at wavelengths in the infra-red spectrum.

7. The system of claim 1, wherein the optical emitter is configured to emit electromagnetic radiation at wavelengths in the visible spectrum.

8. The system of claim 1, wherein the light emitted into the cloud atmosphere is polarized.

9. The system of claim 1, wherein the first optical detector is located a first distance in a first direction transverse from a principal emission direction from the optical emitter and has a first detection field of view intercepting the emission field of view, the first detection field of view centered upon a first principle detection direction, the principle emission direction and the first principle detection direction defining the first backscatter angle.

10. The system of claim 1, wherein the second optical detector is located a second distance in a second direction transverse from a principal emission direction from the optical emitter and has a second detection field of view intercepting the emission field of view, the second detection field of view centered upon a second principle detection direction, the principle emission direction and the second principle detection direction defining the second backscatter angle.

11. The system of claim 1, further comprising:
a detector aligner configured to align a detection direction of the second optical detectors so as to change the second backscatter angle of the detected second portion of the optical beam backscattered by the cloud atmosphere.

12. The system of claim 10, wherein the detector aligner includes a prism located between the one of the first and or second optical detector and the cloud atmosphere.

13. The system of claim 10, wherein the detector aligner includes two prisms located between the second optical detector and the cloud atmosphere, the two prisms configured to coordinately rotate so as to increase and/or decrease the second backscatter angle of the detected second portion of the optical beam backscattered by the cloud atmosphere.

14. A method for characterizing a cloud atmosphere, the method comprising:
emitting, via an optical emitter, an optical beam into the cloud atmosphere;
detecting, via a first optical detector, a first portion of the optical beam backscattered by the cloud atmosphere at a first backscatter angle, wherein the first backscatter angle is defined as a first difference between a first principle emission direction and a principle detection direction;
detecting, via a second optical detector, a second portion of the optical beam backscattered by the cloud atmosphere at a second backscatter angle different from the first backscatter angle, wherein the second backscatter angle is defined as a second difference between the principle emission direction and a second principle detection direction; and
calculating, via a cloud-characteristic calculator, one or more cloud parameters of the cloud atmosphere based on the detected first and second portions.

15. The method of claim 14, wherein calculating, via a cloud-characteristic calculator, one or more cloud parameters of the cloud atmosphere is based on a ratio of the detected first and second portions.

16. The method of claim 14, wherein calculating, via a cloud-characteristic calculator, one or more cloud parameters of the cloud atmosphere is based on a difference between the detected first and second portions.

17. The method of claim 14, further comprising:
controlling, via a detector aligner, a direction of the second optical detector, so as to control the second backscatter angle.

18. The method of claim 14, wherein the one or more cloud parameters includes at least one of effective size of water droplets, liquid water content, effective size of ice crystals, ice water content, and ice crystal shape.

19. The method of claim 14, wherein the optical emitter is configured to emit electromagnetic radiation at wavelengths in the infra-red spectrum.

* * * * *